United States Patent Office 3,328,450
Patented June 27, 1967

3,328,450
SILYLALKYL PHENOLS
Edwin P. Plueddemann, Midland, Mich., assignor to Dow Corning Corporation, Midland, Mich., a corporation of Michigan
No Drawing. Filed Jan. 9, 1963, Ser. No. 250,247
17 Claims. (Cl. 260—448.8)

This invention relates to silylalkyl phenols. More specifically this invention relates to alkyl phenol-substituted organosilicon compounds.

Silyl phenols are known to be relatively unstable compounds, the silyl portion being cleaved rather easily by such reagents as dilute acids and hot dilute alkalis, and the molecule undergoing thermal rearrangement with resultant loss of the phenol functional radical at reasonably moderate temperatures.

It is an object of the present invention to prepare stable silyl phenols. Other objects will be apparent from the following description.

This invention relates to a composition of the formula

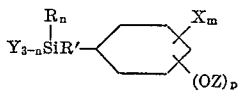

wherein Y is a hydrolyzable substituent, R is selected from the group consisting of monovalent hydrocarbon and halohydrocarbon radicals, each free of aliphatic unsaturation, R' is an alkylene radical of at least two carbon atoms, there being at least two carbon atoms between the benzenoidnucleus and the silicon atom, X is selected from the group consisting of halogen atoms, alkyl radicals, alkoxy radicals, haloalkyl radicals and haloalkoxy radicals, Z is selected from the group consisting of hydrogen atoms, triorganosilyl radicals and divalent diorganosilyl radicals both without aliphatic unsaturation, the latter being present only when $p$ is two and the OZ radicals are on adjacent carbon atoms of the benzenoid ring, each Z radical thereof being one-half a diorganosilyl radical, $m$ has a value of from 0 to 3 inclusive, $n$ has a value of from 0 to 3 inclusive, and $p$ has a value from 1 to 3 inclusive, such that the sum of $m$ and $p$ is no greater than 5.

The compositions of this invention are best prepared by the reaction of an alkenyl phenol of the formula

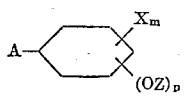

where A is an alkenyl radical (i.e. vinyl, allyl, methallyl, propenyl, octenyl, octadecenyl, etc.) and X, Z and $p$ are as already defined with a silane of the formula

wherein Y, R and $n$ are as above defined. This reaction is best carried out by heating a mixture of the silane and alkenyl phenol at temperatures such as for example, from 50 to 150° C., in the presence of a platinum catalyst. The platinum catalyst can be of any dispersed form such as solutions of chloroplatinic acid or platinum dispersed on charcoal or other materials. The reaction can also be carried out in the presence of an organic peroxide, such as benzoyl peroxide, which promotes the addition of the silane to the alkenyl linkage.

In the compositions above R can be any monovalent radical as defined. Thus radical R can be, for example, alkyl such as methyl, ethyl, propyl, t-butyl and octadecyl; cycloalkyl such as cyclobutyl; aryl such as phenyl, xenyl and naphthyl; alkaryl such as tolyl; aralkyl such as benzyl; and halogenated derivatives such as 3,3,4,4,4-pentafluorobutyl, dibromocyclopentyl, perchlorophenyl, trifluorotolyl, and bromoxenyl. While R can be any defined radical, preferred radicals for commercial products include methyl, ethyl, xenyl, phenyl, 2-phenylpropyl and 3,3,3-trifluoropropyl.

The value of $n$ can be from 0 to 3 inclusive. When $n$ is greater than 1, each R group can be the same or different.

For the purpose of this invention radical R' can be any alkylene radical of at least 2 carbon atoms such as ethylene, propylene, decylene, and octadecylene. The said radical can be straight or branched chain as long as the silicon atom and the benzenoid nucleus are attached to different carbon atoms of this radical. When heat stability of the invented composition is of high importance, it is preferred that radical R' be either ethylene or propylene.

For the purpose of this invention radical Y is any hydrolyzable radical. By hydrolyzable radical is meant one that can be displaced by the action of water. This includes, for example, the halogen atoms (chlorine, bromine, iodine, fluorine), the nominally inorganic radicals (cyanide, isocyanate, thiocyanate, amino, hydroxyamino metalloxy, etc.), and organic radicals attached to the silicon through oxygen, sulphur, and nitrogen atoms. Certain substituted hydrocarbon radicals are also easily displaced by water, and for the purpose of this invention these are also within the scope of the definition of Y. Two examples of this latter type of radical are trichloromethyl and beta-chloroethyl.

Preferred Y radicals because of their ease of preparation and ready availability are selected from the group consisting of the halogen atoms (particularly chlorine), alkoxy radicals (i.e. methoxy, ethoxy, butoxy, hexadecoxy), acyloxy radical (i.e. formoxy, acetoxy, propionoxy) and oxime radicals (i.e. dimethyloxime, ethylpropoxime, pentamethoxime).

Radical X can be any radical as defined above. This includes one or more of halogen atoms (i.e. chlorine, bromine, etc.), alkyl radicals (i.e. methyl, ethyl, propyl, etc.), alkoxy radicals (i.e. methoxy, propoxy, etc.), and halogenated alkyl or alkoxy radicals, (i.e. trifluoromethyl, chloropropyl, bromobutyl and trifluoroethoxy).

The value of $m$ can be from 0 to 3 inclusive; that is, there can be from 0 to 3 X radicals per molecule of the instant composition. When there is more than one X radical, these can be the same or different. The nature and the degree of substitution of the X radical can be varied to alter the compatibility and solubility characteristics of the composition.

Radical Z is hydrogen, triorganosilyl, or in the special case discussed below, divalent diorganosilyl the latter two radicals being without aliphatic unsaturation. When Z is hydrogen the composition is a phenol. When Z is triorganosilyl the composition is a "blocked" (or "masked") phenol. This latter is formed by the reaction of a phenol function with a triorganosilicon halide. The reaction forms hydrogen halide and the blocked phenol. The phenol function is readily regenerated by exposure of the triorganosiloxy group to water, such as moist air. Thus, the primary function of the trioganosilyl radical is to protect the phenol function in, for example, a chemical reaction on some other portion of the molecule containing the said phenol function. Normally this triorganosilyl radical is therefore the trimethylsilyl radical, although any triorganosilyl radical without aliphatic unsaturation can be used, such as ethyldimethylsilyl, ethyldiphenylsilyl, methylpropylphenylsilyl, etc.

In the special case when $p$ is two and the OZ radicals are on adjacent carbon atoms of the benzenoid nucleus, both phenol functions can be blocked by one diorganosilyl group, wherewith each Z is actually one-half a divalent diorganosilyl radical. Thus, the phenolic compound of the structure

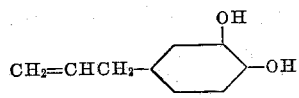

can be reacted with such as $(CH_3)_2SiCl_2$ to give the "blocked" compound

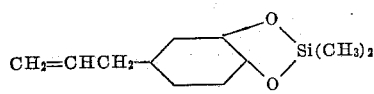

and thereafter reacted with such as $(CH_3O)_3SiH$ to give the compound

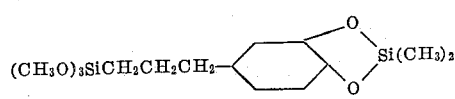

The dihydroxy derivative is regenerated by the action of water, as mentioned earlier for the $R_3Si$—blocked phenols.

When more than one OZ radical is present they can be the same or different. Generally, however, they are alike. Thus, for example, when there are two OZ radicals present and one of the Z radicals is hydrogen, and other is also. Generally, the Z radicals are alike when two or more are present, there being no reason to make them different; but they can be different as well.

The location of radicals X and —OZ on the benzenoid nucleus is unimportant. They can be present on any of the five remaining carbon atoms. Thus, unsubstituted or substituted ortho-, meta-, para-, 2,3-, 2,4-, 2,5-, 2,6-, 3,4-, 3,5-, 2,3,4-, 2,3,5- and 2,4,5-phenols and blocked phenols are possible and are within the scope of this invention.

Hydrolysis of the composition of this invention wherein $n$ is less than 3 will form the composition of the formula

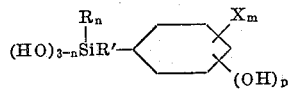

wherein R, R', X, M and p are as previously defined, which composition or their partial silanol (siloxane) condensation products thereof are in many cases water miscible, so that water "solutions" of the instant composition are within the scope of this invention.

This invention also relates to novel cyclic compositions of the formula

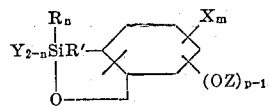

wherein R, R', X, Y, Z, m, and p are as earlier defined and n has a maximum value of two. These compositions are formed from the corresponding compositions described earlier by an intramolecular interaction between an —OZ radical (when Z is hydrogen) and a Y radical, which splits out HY to produce the novel cyclic above. Mild activation such as heating is usually enough, although temperatures near the distillation temperature of the cyclic are preferably employed, and are probably required in many cases. The cyclic above is most easily prepared when Y is a halogen, properably a halogen having an atomic number between 10 and 34. When Y is a halogen, a halogen halide acceptor (i.e. pyridine, picoline, triamylamine, etc.) can be employed to accelerate the reaction.

This invention further relates to siloxanes of the unit formula

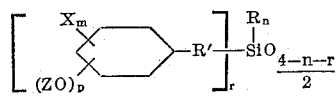

wherein R, R', X, Z, m, and p are as previously defined, n has a value of 0 to 2.999, and r has an average value of from 0.001 to 1 inclusive, the sum of n+r being no greater than 3. These compositions are prepared by the hydrolysis of either of the compositions earlier described, either with or without compositions of the formula $R_nSiY_{4-n}$, where Y is defined as above in which event Z will be hydrogen. The compositions above can also be prepared by the reaction of phenols or triorganosiliyl-blocked phenols of the previously described formula

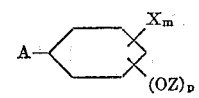

wherein A, Z, X, m and p are as previously defined, with siloxanes of the unit formula

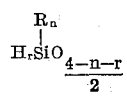

wherein R, n and r are as already defined. The reaction proceeds at temperatures such as, for example, 50 to 150° C., and is usually conducted in the presence of a catalyst such as colloidal platinum or organic peroxides.

The compositions of this invention are useful as softeners in phenolic varnishes and coating resins to give improved flexibility. These are also useful as finishing agents on siliceous materials such as glass, glass cloth, silica, sand, etc., for such end uses as molding compounds, laminates such as polyester and phenolic laminates, shell moldings, and for purposes of sand consolidation. The instant compositions further are valuable as curing agents and accelerators for epoxy resins.

The following examples are offered for illustrative purposes only. The invention is properly delineated in the appended claims. In the examples the symbol Me is used to represent the methyl radical.

*Example 1*

A mixture of 67 g. of orthoallyl phenol, 70 g. of benzene and 0.2 g. of a 0.3 percent chloroplatinic acid solution in 1,2-dimethoxyethylene was heated to reflux (95 to 100° C.) and 135 g. of trichlorosilane added slowly thereto. The reflux temperature first dropped to 70° C., then rose gradually to 110° C. in the next hour. Rectification yielded 30 g. of the silane of the formula

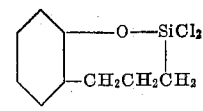

This compound hydrolyzed in water to give a hydroxylated polysiloxane of the unit formula

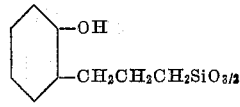

*Example 2*

A mixture of 27 g. of orthoallyl phenol, 20 g. of benzene and .5 g. of the platinum solution of Example 1 was heated to reflux and 40 g. of triethoxy silane added slowly thereto. After complete addition, the mixture was refluxed two hours, then stripped to 100° C. at 5 mm. to remove solvents and unreacted silane. The non-volatile fraction, of the formula

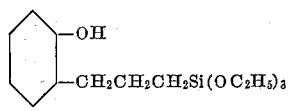

was dissolved in 65 percent aqueous ethanol. A water clear solution resulted which was suitable for application to siliceous surfaces as a sizing.

Example 3

A mixture of 164 g. of eugenol, 50 g. of benzene and 0.2 g. of the platinum solution of Example 1 was heated to the reflux. A mixture of pentemethyl disiloxane and symmetrical tetramethyl disilioxane (100 g.) was added slowly, and thereafter the materials refluxed for two hours. Rectification yielded Me₃SiOSi(Me₂)CH₂CH₂CH₂—C₆H₃(OMe)—OH B.$_{0.2}$ 120° C., D$^{25}$ 0.973, $n_D^{25}$ 1.4805, and $$O\left(Si(Me_2)CH_2CH_2CH_2-C_6H_3(OMe)-OH\right)_2$$

B.$_{0.2}$ 215° C., D$^{25}$ 1.042, vics. 132 cs.

Example 4

Following the procedure of Example 2, iso-eugenol gave the products (I) Me₃SiOSi(Me₂)—CH(CH₃)CH₂—C₆H₃(OMe)—OH B.$_{0.5}$ 130–5° C., $n_D^{25}$ 1.4810, D 0.973, and (II) $\left[O\ Si(Me_2)—CH(CH_3)CH_2—C_6H_3(OMe)—OH\right]_2$ B.$_{0.2}$ 218–30° C., $n_D^{25}$ 1.5078, D 1.035.

Example 5

Following the procedure of Example 3, orthoallyl phenol yielded

I) Me₃SiOSi(Me₂)CH₂CH₂CH₂—C₆H₄—OH

B.$_{0.5}$ 115.8, $n_D^{25}$ 1.4791, D 0.951, and (II) $\left[O\ Si(Me_2)CH_2CH_2CH_2—C_6H_4—OH\right]_2$ B.$_1$ 213–5° C., $n_D^{25}$ 1.5216, D$_{25}$ 1.034.

Both compounds are soluble in 60 percent aqueous ethanol and are suitable for cosmetic or antiseptic applications. Compounds II of Examples 5 and 6 are suitable for the preparation of polycarbonate resins e.g., for example, reaction with diphenylcarbonate.

Example 6

A mixture of 135 g. of orthoallyl phenol, 100 g. of dimethylchlorosilane and 0.1 g. of the platinum solution of Example 1 were refluxed for two hours, during which time the temperature rose gradually to 140° C. Distillation yielded the product of the structure Me₂SiCH₂CH₂CH₂—C₆H₄—O— (cyclic)

B.$_1$ 80° C.

Example 7

A mixture of 150 g. of pentamethyl disiloxane, 250 g. cardanol and 30 drops of the platinum solution of Example 1 refluxed 18 hours during which time the temperature rose from 85° C. to 113° C. Distillation yielded 200 g. of Me₃SiOSi(Me₂)C₁₅H₃₀—C₆H₄—OH

B.$_{0.5}$ 190–5° C., D 0.916.

Example 8

A mixture of 164 g. of eugenol and 79 g. of pyridine in 250 ml. of toluene was stirred while adding 79 g. of Me₃SiCl, and then warmed one hour at 90° C. After filtering the pyridine hydrochloride, the filtrate was distilled to give 213 g. of (I) CH₂=CHCH₂—C₆H₃(OMe)—OSiMe₃

B.$_{0.1}$ 75–80° C., $n_D^{25}$ 1.4958.

A solution of 142 g. of (I) in 200 ml. toluene and 1 ml. of an isopropanol solution one percent in platinum as chloroplatinic acid was stirred at 105 to 110° C. while adding 122 g. (MeO)₃SiH, after which the mixture was held at 110 to 111° C. overnight. Distillation gave 83 g. of product of the structure (II) (MeO)₃SiCH₂CH₂CH₂—C₆H₃(OMe)—OSiMe₃

B.$_4$ 158 to 67° C., $n_D^{25}$ 1.4745, 14.9% Si, calc. 15.4% Si, infrared analysis consistent with the structure. Hydrolysis of (II) in aqueous methanol gave (HO)₃SiCH₂CH₂CH₂—C₆H₃(OMe)—OH and partial silanol condensation derivatives thereof. The soluble hydrolysis product in aqueous methanol was used to treat glass cloth.

Example 9

A mixture of 164 g. of eugenol and 15 drops of an isopropanol solution one percent in platinum (as chloroplatinic acid) was warmed to 80° C. with stirring, and 122 g. of trimethoxysilane added slowly thereto. An exothermic reaction resulted. After complete addition of the trimethoxysilane the reaction vessel and contents were heated an additional hour at 80 to 100° C., then stripped to 10 mm. pressure at this temperature. There was recovered 256 g. of impure silylalkyl phenol of the formula MeO—C₆H₃(O—)(MeO)₃SiCH₂—CH₂—CH₂

Example 10

When the following phenolic compounds are reacted with trichlorosilane in the presence of a platinum catalyst, products as shown are formed:

| Phenolic Compound | Product |
|---|---|
| $CH_2=CHCH_2-C_6H_3(Cl_3)(OH)$ | $Cl_3SiCH_2CH_2CH_2-C_6H_3(Cl_3)(O)$ |
| $CH_2=CHCH_2-C_6H_3(OSiMe_3)(CMe_3)$ | $Cl_3SiCH_2CH_2CH_2-C_6H_3(OSiMe_3)(CMe_3)$ |
| $CH_2=CH(CH_2)_6-C_6H_3(CHCl_2)(OH)$ | $Cl_3Si(CH_2)_8-C_6H_3(CHCl_2)(OH)$ |
| $CH_2=CH-C_6H_3(OCH_2CF_3)_2(OSiMe_2(C_2H_5))$ | $Cl_3SiCH_2CH_2-C_6H_3(OCH_2CF_3)_2(OSiMe_2(C_2H_5))$ |

Example 11

When the following silanes are reacted with orthoallyl phenol as per Example 10, products as shown are formed:

| Silane | Product |
|---|---|
| $(C_6H_5-)_2SiHMe$ | $(C_6H_5-)_2Si(Me)CH_2CH_2CH_2-C_6H_4OH$ |
| $(C_6H_5)_2H_2NSiH$ | $(C_6H_5)_2H_2NSi-CH_2-CH_2CH_2-C_6H_4OH$ |
| $(CH_3C(O)-O-)_2SiH(CH_2CH_2CF_3)$ | $(CH_3C(O)-O-)_2Si(CH_2CH_2CF_3)CH_2CH_2CH_2-C_6H_4OH$ |
| $(C_6H_4(CF_3)-CH_2Si(Me)(C_3H_7)O-)_2SiH$ | $(C_6H_4(CF_3)-CH_2Si(Me)(C_3H_7)O-)_2SiCH_2CH_2CH_2-C_6H_4OH$ |
| $(Me_2C=NO)_3SiH$ | $(Me_2C=N-O)_3SiCH_2CH_2CH_2-C_6H_4OH$ |

Example 12

Allylhydroquinone forms the product of the formula

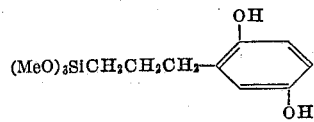 (I)

when reacted with trimethoxysilane in the presence of a platinum catalyst.

When the product (I) is hydrolyzed with water, a siloxane of the unit formula

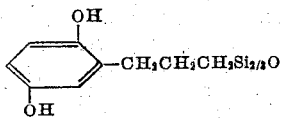

is formed.

When the product (I) is cohydrolyzed with a mixture of $CH_3(C_6H_5)Si(OMe)_2$, $(CH_3)_2Si(OMe)_2$ and
$$Me(C_6H_5)_2SiOMe$$

a copolymer polysiloxane is formed containing units of the structures

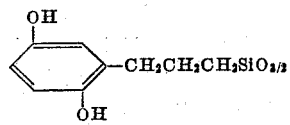

$Me(C_6H_5)SiO$, $Me_2SiO$ and $Me(C_6H_5)_2SiO_{1/2}$.

Example 13

and

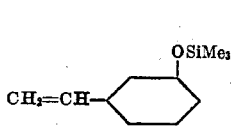

form the product

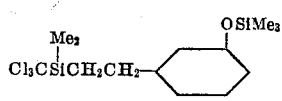

when heated together in the presence of a catalytic amount of benzoyl peroxide. Hydrolysis of the product above will form the disiloxane of the formula

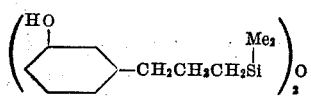

Example 14

When allyl catechol is added to trimethoxysilane in the presence of a platinum catalyst there is formed the product

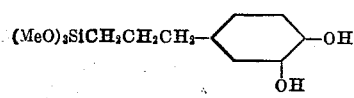

When this composition is hydrolyzed with water a hydroxylated siloxane polymer is formed of the unit formula

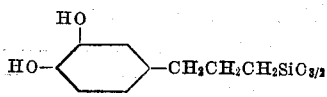

Example 15

When trimethoxysilane is reacted with the following allyl trihydroxybenzenes in the presence of a platinum catalyst, products as shown are formed:

| Trihydroxybenzene | Product |
|---|---|
| ![OH,OH,CH2=CHCH2] | ![OH,OH,(MeO)3SiCH2CH2CH2] |
| ![HO,CH2=CHCH2,OH,OH] | ![HO,(MeO)3SiCH2CH2CH2,OH,OH] |
| ![HO,CH2=CHCH2,HO,OH] | ![HO,(MeO)3SiCH2CH2CH2,HO,OH] |

That which is claimed is:
1. A composition of the formula

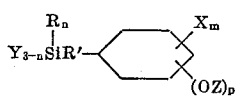

wherein
each Y is a hydrolyzable substituent,
R is selected from the group consisting of monovalent hydrocarbon and halohydrocarbon radicals, each free of aliphatic unsaturation,
R' is an alkylene radical of at least two carbon atoms, there being at least two carbon atoms between the benzenoid nucleus and the silicon atom,
X is selected from the group consisting of halogen atoms, alkyl radicals, alkoxy radicals, haloalkyl radicals and haloalkoxy radicals,
Z is selected from the group consisting of hydrogen atoms, trihydrocarbylsilyl radicals and divalent dihydrocarbylsilyl radicals free of aliphatic unsaturation, the latter being present only when
p is two, and the
OZ radicals are on adjacent carbon atoms of the benzenoid ring, each
Z radical thereof being one-half a dihydrocarbylsilyl radical,
m has a value of from 0 to 3 inclusive,
n has a value of from 0 to 3 inclusive, and
p has a value from 1 to 3 inclusive the sum of m and p being no greater than 5.

2. The composition of claim 1 wherein Y is alkoxy, R is a monovalent hydrocarbon radical free of aliphatic unsaturation, m is 0 and Z is hydrogen.

3.

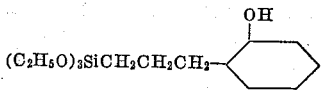

4. The composition of claim 1 wherein Y is alkoxy, R is a monovalent hydrocarbon radical free of aliphatic unsaturation, X is alkoxy and Z is triorganosilyl.

5.

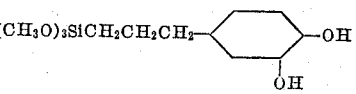

6. A composition of the formula

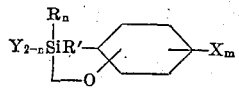

wherein
Y is a hydrolyzable substituent,
R is selected from the group consisting of monovalent hydrocarbon and halohydrocarbon radicals, each free of aliphatic unsaturation,
R' is an alkylene radical of at least two carbon atoms there being at least two carbon atoms between the benzenoid nucleus and the silicon atom,
X is selected from the group consisting of halogen atoms, alkyl radicals, alkoxy radicals, haloalkyl radicals and haloalkoxy radicals, $m$ has a value of from 0 to 3 inclusive, and $n$ has a value of from 0 to 2 inclusive.

7. The composition of claim 6 wherein Y is halogen, R is a monovalent hydrocarbon radical free of aliphatic unsaturation and $m$ is 0.

8.

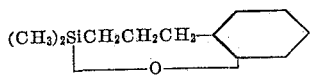

9.

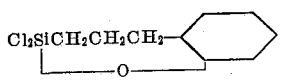

10. A siloxane of the unit formula

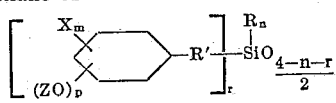

wherein

R is selected from the group consisting of monovalent hydrocarbon and halohydrocarbon radicals, each free of aliphatic unsaturation, R' is alkylene radical of at least two carbon atoms, there being at least two carbon atoms between the benzenoid nucleus and the silicon atom, X is selected from the group consisting of halogen atoms, alkyl radicals, alkoxy radicals, haloalkyl radicals and haloalkoxy, Z is selected from the group consisting of hydrogen atoms, trihydrocarbylsilyl radicals, and divalent dihydrocarbylsilyl radicals, both silyl radicals being free of aliphatic unsaturation, the latter radical being present only when $p$ is two and the OZ radicals are on adjacent carbon atoms of the benzenoid ring, each Z radical thereof being one-half a dihydrocarbylsilyl radical, $m$ has a value from 0 to 3 inclusive, $n$ has a value of from 0 to 2.999 inclusive, $p$ has a value of from 1 to 3 inclusive, and $r$ has an average value of from 0.001 to 1 inclusive, the sum of $n+r$ being no greater than 3 and the sum of $m$ and $p$ being no greater than 5.

11. The composition of claim 10 wherein R is a monovalent hydrocarbon radical free of aliphatic unsaturation, X is alkoxy and Z is hydrogen.

12. A polymer of the unit formula

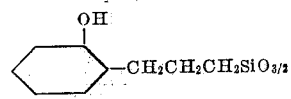

13.

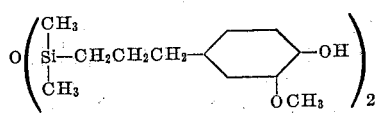

14.

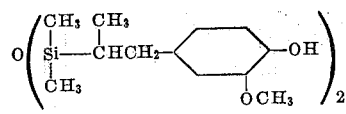

15. A polymer of the unit formula $$(HO)_2C_6H_3CH_2CH_2CH_2SiO_{3/2}$$

16. A composition of the structure

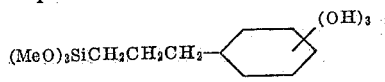

17.

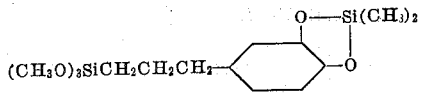

References Cited

UNITED STATES PATENTS

| 2,611,777 | 9/1952 | Speier | 260—448.2 |
| 2,611,781 | 9/1952 | Speier | 260—448.8 |
| 2,711,417 | 6/1955 | Frisch | 260—448.2 |

OTHER REFERENCES

Chemical Abs., 56, 1962, columns 10, 181–182 (abstract of 1961 article of Kohama).

TOBIAS E. LEVOW, *Primary Examiner.*

SAMUEL H. BLECH, HELEN M. McCARTHY, P. F. SHAVER, *Assistant Examiners.*